US012746980B2

(12) United States Patent
Vandervoord et al.

(10) Patent No.: US 12,746,980 B2
(45) Date of Patent: Sep. 29, 2026

(54) VERTICAL STORAGE MODULE FOR VEHICLE BED SYSTEM

(71) Applicant: FCA US LLC, Auburn Hills, MI (US)

(72) Inventors: Gregory Vandervoord, Clarkston, MI (US); Dan M Zimmermann, West Bloomfield, MI (US); Mark C Trostle, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 404 days.

(21) Appl. No.: 18/495,911

(22) Filed: Oct. 27, 2023

(65) Prior Publication Data

US 2024/0140538 A1 May 2, 2024

Related U.S. Application Data

(60) Provisional application No. 63/420,751, filed on Oct. 31, 2022.

(51) Int. Cl.
*B62D 33/02* (2006.01)

(52) U.S. Cl.
CPC ................................ *B62D 33/0207* (2013.01)

(58) Field of Classification Search
CPC .............................. B62D 33/0207; B60R 9/00
See application file for complete search history.

(56) References Cited

U.S. PATENT DOCUMENTS

| | | | | |
|---|---|---|---|---|
| 4,770,458 A * | 9/1988 | Burke | B60R 9/00 | 296/3 |
| 4,789,195 A * | 12/1988 | Fletcher | B60R 11/06 | 224/543 |
| 5,002,324 A * | 3/1991 | Griffin | B60R 9/00 | 296/3 |
| 5,299,722 A * | 4/1994 | Cheney | B60R 11/06 | 224/404 |
| 6,347,731 B1 * | 2/2002 | Burger | B60R 9/00 | 224/403 |
| 10,259,508 B2 * | 4/2019 | Leitner | B60R 11/06 | |
| 2006/0279099 A1 * | 12/2006 | Ranka | B60R 11/06 | 296/37.6 |
| 2007/0267885 A1 * | 11/2007 | Thelen | B60R 9/00 | 296/37.6 |
| 2009/0166390 A1 * | 7/2009 | Flaherty | B60R 9/00 | 224/403 |
| 2014/0021232 A1 * | 1/2014 | Lazarevich | B60R 7/04 | 224/539 |
| 2014/0197653 A1 * | 7/2014 | Stepanians | B60P 3/40 | 296/3 |

* cited by examiner

*Primary Examiner* — Lori Lyjak
(74) *Attorney, Agent, or Firm* — Jeremy J. Klobucar

(57) ABSTRACT

A vehicle includes a vehicle body having a truck bed at least partially defined by a floor, a forward wall, sidewalls, and a tailgate. A pair of outboard support bars are each coupled to and extend over one sidewall, and a vertical inner open area is defined between the support bar and the sidewall. A vertical storage module is disposed in the open inner area and includes a shell defining an inner storage area. A door is rotatably coupled to the shell to selectively enclose the inner storage area.

17 Claims, 5 Drawing Sheets

VERTICAL STORAGE MODULE FOR VEHICLE BED SYSTEM

CROSS-REFERENCE TO RELATED APPLICATION

This application claims the benefit of U.S. Provisional Pat. App. No. 63/420,751, filed Oct. 31, 2022, the contents of which are incorporated herein by reference thereto.

FIELD

The present application relates generally to vehicle storage systems and, more particularly, to a vertical storage module for a vehicle truck bed system.

BACKGROUND

Some vehicles, such as pickup trucks, include rear storage areas commonly known as a trunk or cargo beds. However, the rear storage area may be limited or difficult to reach. Aftermarket products to improve storage capability include bed boxes, utility boxes, saddle bags, swing out bed boxes, decked/bed slide systems, and bed caps. However, such products can be heavy, expensive, and compromise bed storage capacity and/or aerodynamics. Therefore, while such systems do work well for their intended purpose, it is desirable to provide continuous improvement in the relevant art to provide greater utility.

SUMMARY

In accordance with one example aspect of the invention, a vehicle is provided. In one example implementation, the vehicle includes a vehicle body having a truck bed at least partially defined by a floor, a forward wall, sidewalls, and a tailgate. A pair of outboard support bars are each coupled to and extend over one sidewall, and a vertical inner open area is defined between the support bar and the sidewall. A vertical storage module is disposed in the open inner area and includes a shell defining an inner storage area. A door is rotatably coupled to the shell to selectively enclose the inner storage area.

In addition to the foregoing, the described vehicle may include one or more of the following features: wherein the shell includes a lower shell and an upper shell; wherein the lower shell is seated in a cutout formed in the sidewall and defines a lower storage bin; wherein the lower shell is disposed within the sidewall; wherein the lower shell defines a trough that receives a seal member configured to establish a seal between the lower shell, the upper shell, and the door; and wherein the vertical storage module further includes a support rail coupled between the upper shell and the lower shell to provide additional support and rigidity to the vertical storage module.

In addition to the foregoing, the described vehicle may include one or more of the following features: wherein the vertical storage module further includes an inner support structure coupled to the upper shell that provides modular lightweight load carrying equipment; wherein the vertical storage module further includes a storage shelf coupled to the upper shell to provide a storage surface, the storage shelf dividing the interior storage area into an upper storage area and a lower storage area; wherein the door is rotatably coupled to the shell via one or more hinges; and wherein the vertical storage module further includes at least one gas strut coupled to the door.

In addition to the foregoing, the described vehicle may include one or more of the following features: wherein the door includes a door body, an upper interior door rotatably coupled to the door body and movable between an open position giving access to an upper storage area of the inner storage area, and a closed position that encloses the upper storage area, and a lower interior door rotatably coupled to the door body and movable between an open position giving access to a lower storage area of the inner storage area, and a closed position that encloses the lower storage area; and wherein the inner open area defined between the support bar and the sidewall includes an outer profile shape, and wherein the vertical storage module includes an outer profile shape complimentary to the outer profile shape of the inner open area to give the vehicle the appearance of a wall.

In addition to the foregoing, the described vehicle may include one or more of the following features: wherein each support bar includes a forward end and a rearward end, the rearward end coupled to the sidewall proximate the tailgate; a stanchion coupled between the support bar forward end and the sidewall; wherein the stanchion is telescopic to move the support bar between a lowered position and a raised position; a grab handle coupled to the stanchion to assist a user; a cross-rail coupled to the stanchion and extending across the truck bed; and a cross-rail removably coupled between the pair of support bars.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, some vehicles include rear cargo beds for storage. Some aftermarket products improve storage capability, but are often heavy, expensive, and compromise bed storage capacity and aerodynamics. Accordingly, described herein is a vehicle with a vertical storage module that mounts within the sidewall of the rear cargo bed without compromising the cargo bed footprint.

In the example embodiments, a vehicle bedcap system includes a bed/roof rack with a bedcap and allows access to cargo bed storage while the bedcap is on the vehicle. The bedcap system relies on the roof rack for structure, and the bedcap includes three opening hatches including two side hatches and one liftgate. One or more of the opening hatches can include gas strut assistance. The roof rack is adjustable (e.g., raised/lowered), for example, into a low position to support the bedcap, and a higher position for carrying larger items above the roof of the cab or supporting tall items within the bed. In some implementations, roof rack cross rails utilize a T-track fastening system, and a MOLLE panel is attachable to the roof rack.

In one example, the vertical storage module mounts within the footprint of the roof rack access panels and provides additional storage. Each storage module includes a collar, an outer pack box, a two-piece shelf, an access door, a latch, gas struts, hinges, and a seal. The storage module is configured to integrate into the bedcap system and at least partially receives its structure from the telescoping roof rack. The roof rack includes telescoping extrusions, bed brackets, cross-rails, and fasteners, while also utilizing upper stanchion caps and a grab handle for high reaching gear. Example materials for the storage module include carbon fiber and aluminum, while the bed/roof rack may be fabricated from steel. The storage module mounts to the bed rails and access is gained through a hatch panel that uses hinges (e.g., goose-neck) and gas assisted struts. Latching includes a striker and a latch (e.g., push-button).

The vertical storage module advantageously provides: integrated storage without compromising the bed footprint, lightweight storage, additional secure storage, quick access to items unreachable in the bed, additional roof cross-rails for mounting gear/accessories, integral/aerodynamic shape that appears like modern SUVs, and a smaller size module to provide benefits of a bed cap without potential logistical/vertical storage issues of a bed cap.

Figure 1:
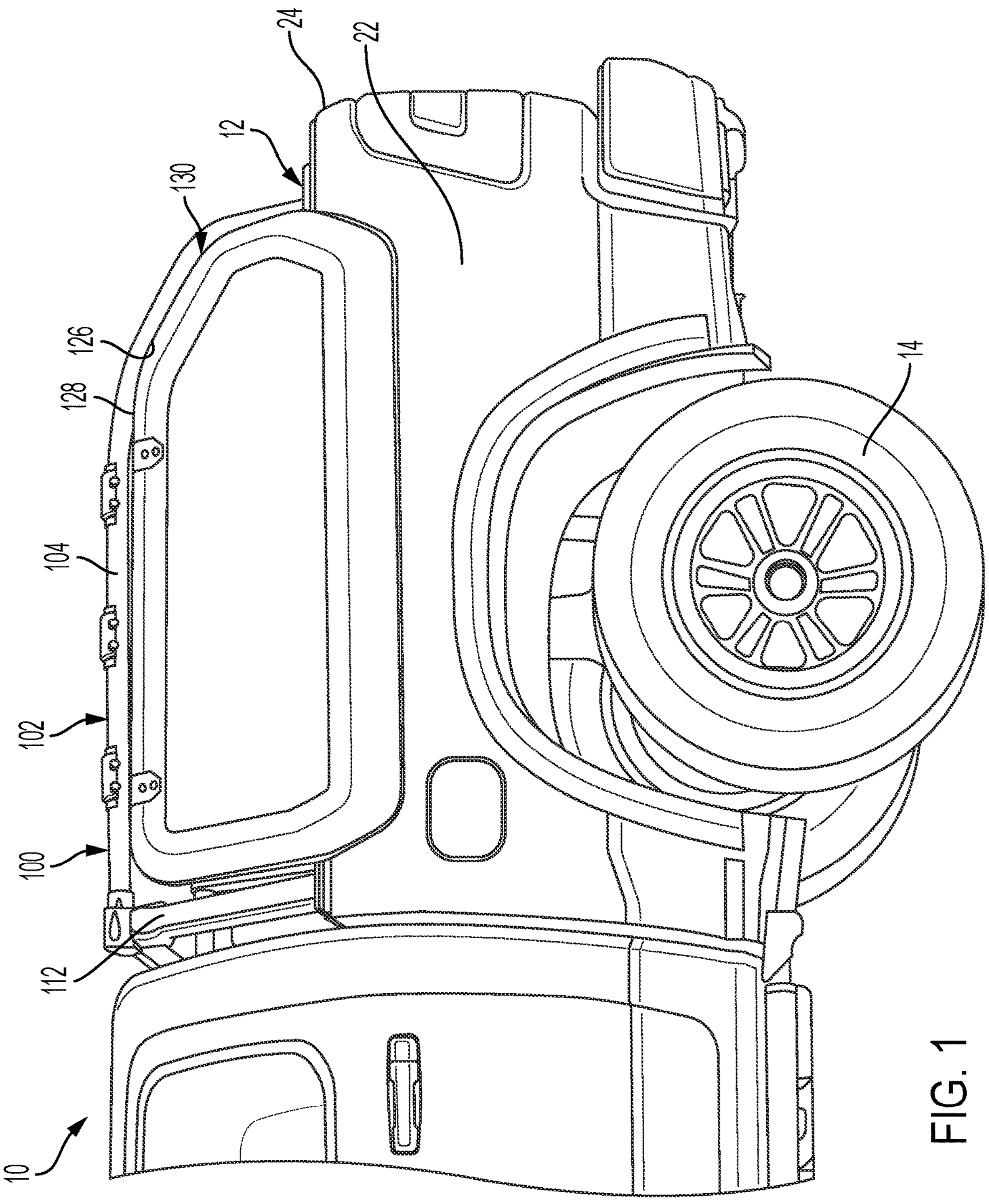
FIG. 1 is a side view an example vertical storage module integrated into a storage bed of a vehicle, in accordance with the principles of the present application.
Figure 2:
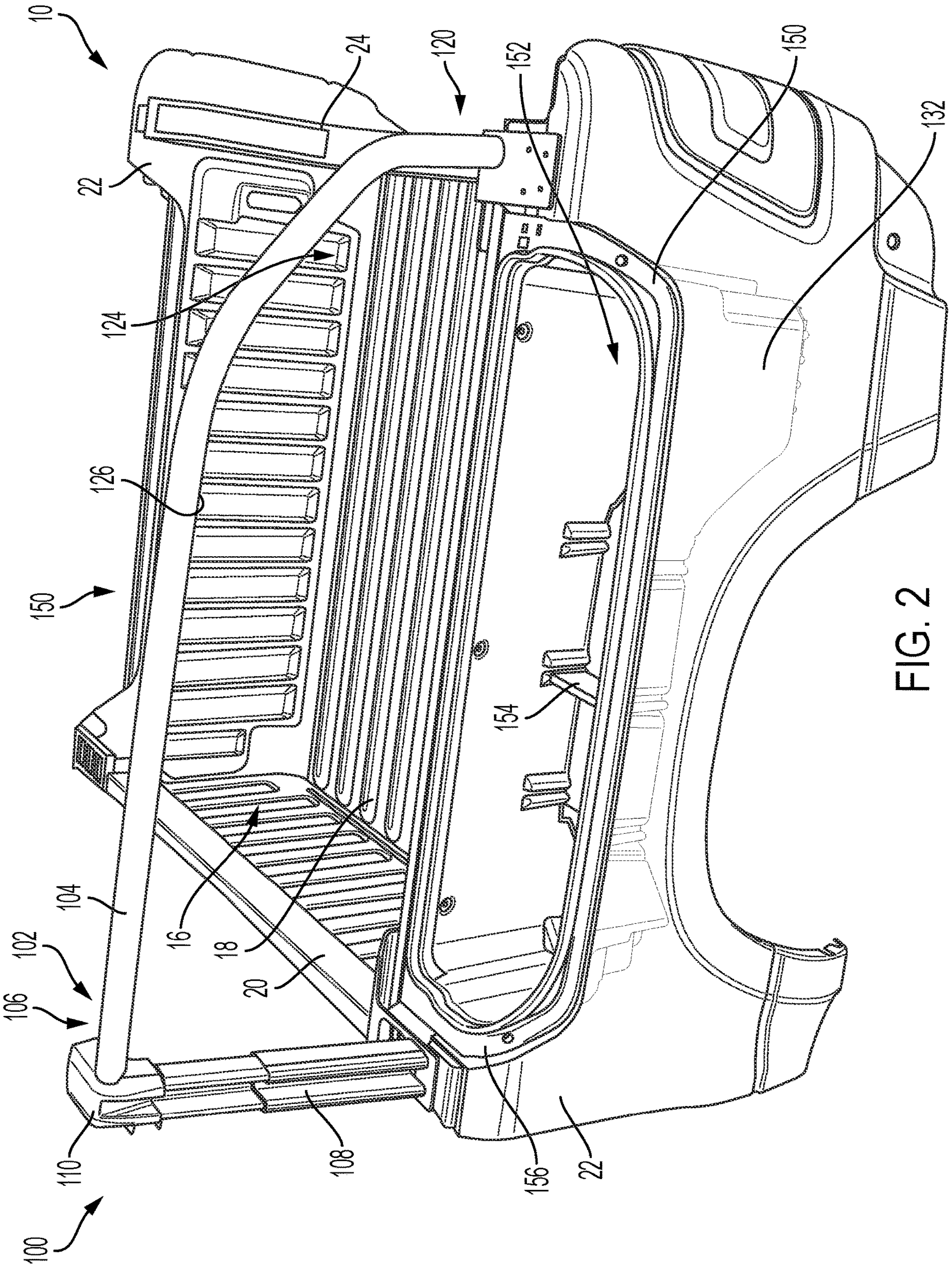
FIG. 2 is a top perspective view of the vehicle storage bed of FIG. 1 illustrating a portion of the vertical storage module, in accordance with the principles of the present application.

With initial reference to FIGS. 1 and 2, side and perspective views of a vehicle 10 are illustrated. The vehicle 10 includes a storage bed 12 located above one or more rear wheels 14. In one exemplary implementation, the vehicle 10 is a pickup truck as illustrated. The storage bed 12 provides a truck bed or cargo area 16 defined at least partially by a floor 18, a forward wall 20, sidewalls 22, and a tailgate 24.

In the example embodiment, vehicle 10 includes a bedcap/rack system 100 and a pair of vertical storage modules 130 configured to integrate therewith. In one example configuration, each vertical storage module 130 provides a storage area extending downward between the rear quarter panel and the truck bed and upward above the rear quarter panel adjacent the bedcap/rack system 100. In this exemplary configuration or an alternate configuration, the vertical storage module 130 extends downward over the vehicle bedside.

As shown in FIGS. 1 and 2, the bedcap system 100 generally includes a roll bar or roof rack 102 and a bedcap (not shown) configured to removably couple thereto (shown removed). With additional reference to FIG. 3, the roof rack 102 generally includes a pair of outboard support bars 104 (only one shown) disposed over storage bed sidewalls 22. Each roof rack 102 is supported at a forward end 106 by a stanchion 108 and a stanchion cap 110.

Figure 3:
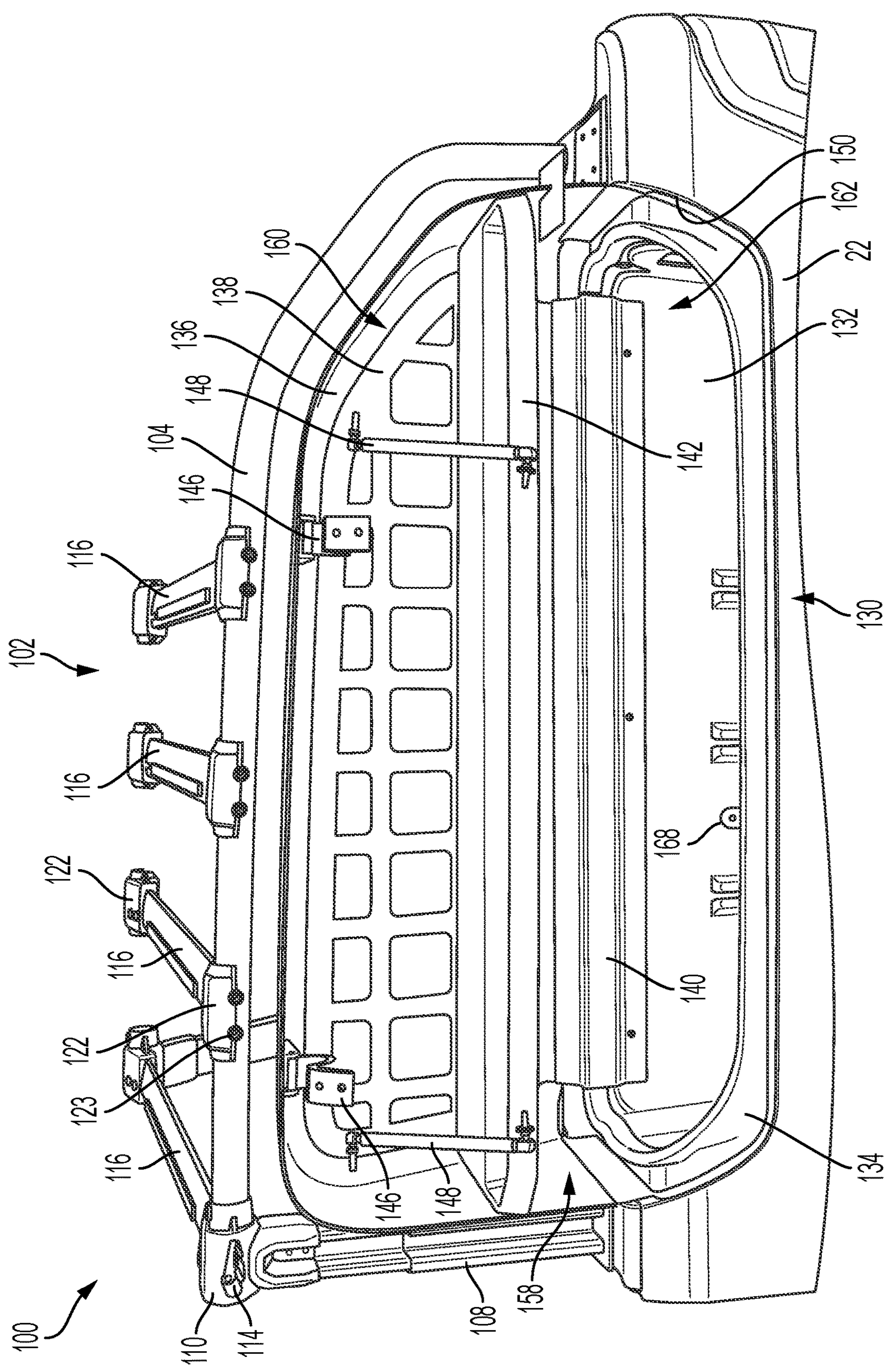
FIG. 3 is a side view of the vertical storage module shown in FIG. 1, without an enclosure door, in accordance with the principles of the present application.

Each stanchion 108 is removably coupled to the vehicle forward wall 20 and/or sidewalls 22 and is configured for telescoping movement such that the roof rack 102 is movable between a lowered position (e.g., FIG. 1) and a raised position (not shown, e.g., above the vehicle roof), for example to support the bedcap or various equipment. As shown in FIG. 1, stanchion 108 may include a grab handle 112 to assist a user in reaching equipment on the roof rack 102. The grab handle 112 may be configured for telescoping movement with the movable roof rack 102. As shown in FIG. 3, in one example, the stanchion cap 110 includes a release lever 114 for releasably coupling the stanchion 108, support bar 104, and/or a support or cross-rail 116.

In the illustrated example, the support bar 104 also includes a rear end 120 removably coupled to the vehicle body (e.g., sidewalls 22) proximate the tailgate 24. The support bar 104 is configured to move between the raised and lowered positions, for example as the stanchion 108 is raised or lowered. As shown in FIG. 3, one or more cross-rails 116 are removably coupled to and extend between the outboard support bars 104 to support the bedcap or various equipment. In the illustrated example, a first cross-rail 116 extends between the stanchions 108 and is removably coupled to the stanchion caps 110 via the release lever 114. Additional cross-rails 116 extend between the opposed support bars 104 in a position rearward of the first cross-rail 116. The additional cross rails 116 include cross-rail adapters 122 at each end configured to removably couple to the support bars 104 via one or more fasteners 123. In this way, the roof rack 102 is customizable with a desired number and position of cross-rails 116.

Once installed, the roof rack 102 defines an inner open area or window 124 between the sidewall 22, the support bar 104, and the stanchion 108 (e.g., see FIG. 2) on each side of the vehicle 10. This window 124 includes a vertical footprint or outer profile shape 126. In this way, the vertical storage module 130 is configured to be received within the window 124 and includes an outer profile shape 128 complimentary to (e.g., shaped like) outer profile shape 126. As shown in FIG. 1, this gives vehicle 10 the appearance of a sidewall similar to an SUV.

Figure 4:
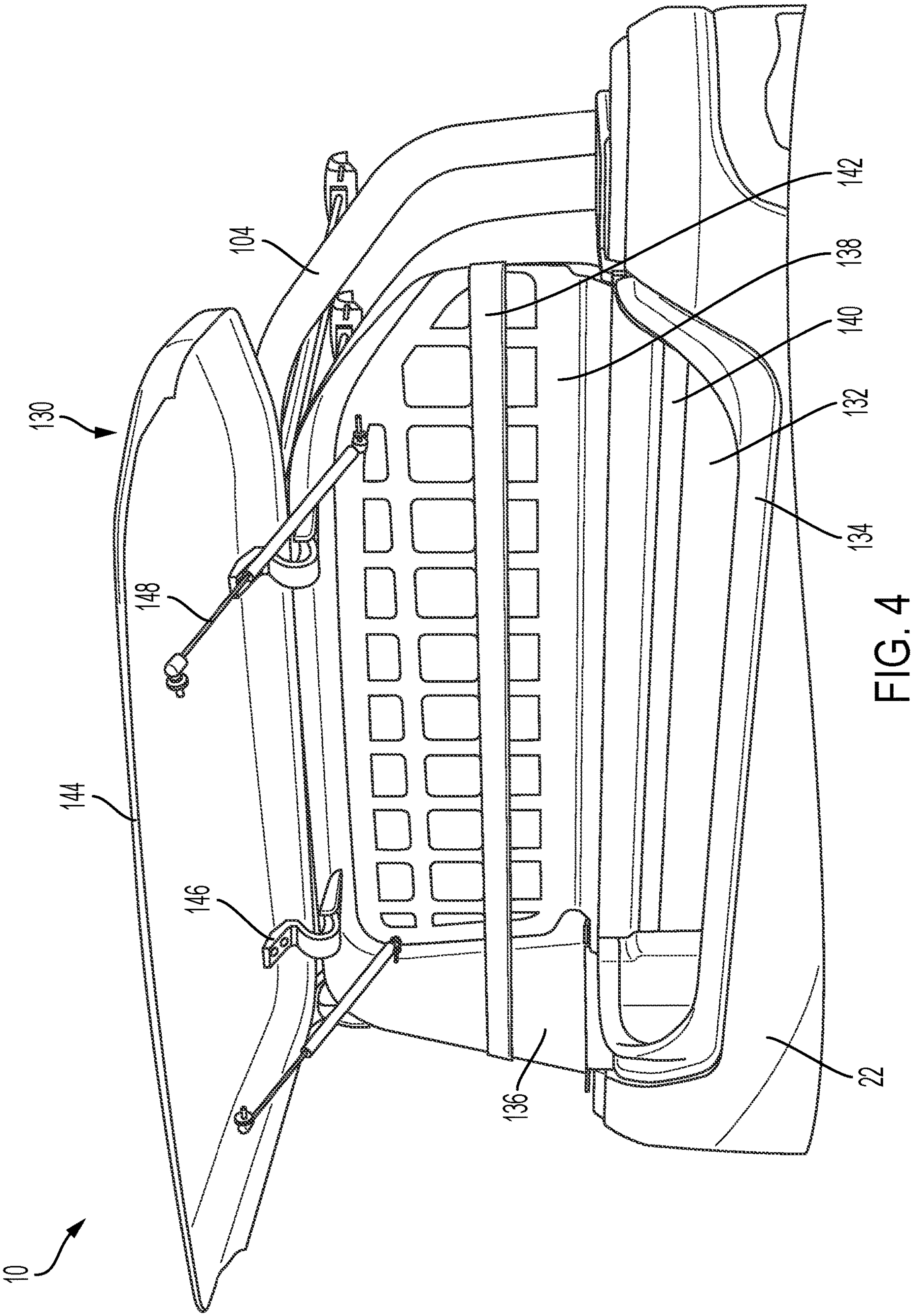
FIG. 4 is perspective view of the vertical storage module shown in FIG. 3, with the enclosure door, in accordance with the principles of the present application.

With reference now to FIGS. 2-4, the vertical storage module 130 will be described in more detail. While one storage module 130 is shown in the figures positioned over the left-hand sidewall 22 of vehicle 10, it will be appreciated that a mirrored vertical storage module 130 may be present over the right-hand sidewall 22 of the vehicle 10. In the example embodiment, the vertical storage module 130 generally includes a lower shell 132, a collar or seal member 134, an upper shell 136, an inner support structure 138 (e.g., MOLLE structure), a support rail 140, a storage shelf 142, at least one enclosure door 144, one or more hinges 146, and one or more gas struts 148.

As shown in FIG. 2, the lower shell 132 is configured to seat into a cutout 150 in the vehicle sidewall 22, such as the rear quarter panel, and generally defines a storage compartment 152, which can receive one or more storage compartment dividers 154. The storage compartment 152 extends downward, below the cutout 150 so as to provide a lower storage bin. The upper outer edge of lower shell 132 defines a trough 156 configured to receive the seal member 134 (FIG. 3) for establishing a seal between the lower shell 132, the upper shell 136, and/or the door 144. Additionally, the seal member 134 may be fabricated from a rigid material configured to provide additional structure/support to the storage module 130.

The inner support structure 138 is fabricated from a rigid material (e.g., aluminum) and is configured to couple to the lower shell 132 and/or the upper shell 136 to provide additional support/rigidity to the storage module 130. Additionally, the inner support structure 138 may include various cutouts and serve as modular lightweight load carrying equipment. The support rail 140 is fabricated from a rigid material and is coupled between the lower shell 132, the upper shell 136, and/or the inner support structure 138 to provide additional support/rigidity to the storage module 130. The storage shelf 142 is coupled to the upper shell 136 and/or the inner support structure 138 to provide a storage surface. Moreover, the storage shelf 142 divides an interior storage area 158 defined by the lower shell 132 and upper shell 136 into an upper storage area 160 and a lower storage area 162.

As shown in FIG. 4, in one example, the enclosure door 144 is rotatably coupled to an upper wall of the upper shell 136 by hinges 146. The door 144 is supported in an open position by gas struts 148. The door 144 is movable between an open position (FIG. 4) giving access to the interior storage area 158 and a closed position (FIG. 1) that encloses the interior storage area 158.

Figure 5:
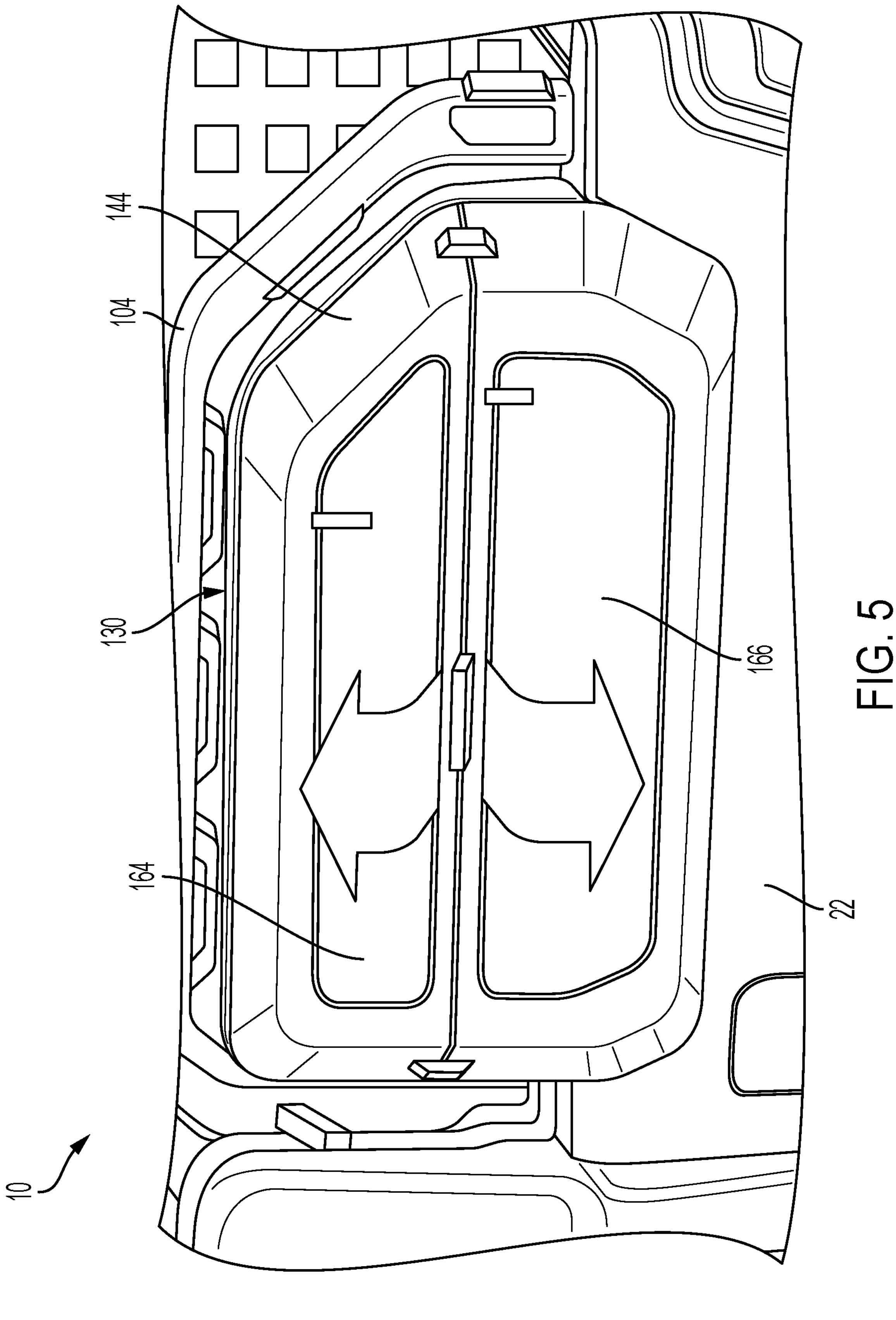
FIG. 5 is a perspective view of another embodiment of the vertical storage module with the enclosure door having an interior upper door and an interior lower door, in accordance with the principles of the present application.

In an example alternative embodiment, shown in FIG. 5, the door 144 includes an upper interior door 164 and a lower interior door 166. The upper interior door 164 is rotatably coupled to the body of door 144 and is movable between an open position giving access to the upper storage area 160, and a closed position that encloses the upper storage area 160 when the door 144 is in the closed position. Similarly, the lower interior door 166 is rotatably coupled to the body of door 144 and is movable between an open position giving access to the lower storage area 162, and a closed position that encloses the lower storage area 162 when the door 144 is in the closed position. It will be appreciated that the illustrated door arrangements are merely exemplary and other door arrangements/configurations are envisioned. Further, doors 144, 164, 166 may include one or more lockable latches 168 (e.g., FIG. 4) for securing the doors in the closed position.

Described herein are systems and methods for providing additional storage in pickup-type vehicles. The system includes a pair of support bars attached to and disposed over the sidewalls of the truck bed. Vertical storage modules are integrated into the sidewalls and extend upward into a space defined between each support bar and an upper surface of the associated sidewall. The storage module includes customizable features such as dividers and shelves to define various storage compartments therein, and a door is configured to selectively enclose and secure the storage module.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle comprising:

a vehicle body including a truck bed at least partially defined by a floor, a forward wall, sidewalls, and a tailgate;

a pair of outboard support bars each coupled to and extending over one sidewall, wherein a vertical inner open area is defined between the support bar and the sidewall; and a vertical storage module disposed in the open inner area and including a shell defining an inner storage area, and a door rotatably coupled to the shell to selectively enclose the inner storage area, wherein the shell includes a lower shell and an upper shell.

2. The vehicle of claim 1, wherein the lower shell is seated in a cutout formed in the sidewall and defines a lower storage bin.

3. The vehicle of claim 2, wherein the lower shell is disposed within the sidewall.

4. The vehicle of claim 2, wherein the lower shell defines a trough that receives a seal member configured to establish a seal between the lower shell, the upper shell, and the door.

5. The vehicle of claim 1, wherein the vertical storage module further includes a support rail coupled between the upper shell and the lower shell to provide additional support and rigidity to the vertical storage module.

6. The vehicle of claim 1, wherein the vertical storage module further includes an inner support structure coupled to the upper shell that provides modular lightweight load carrying equipment.

7. The vehicle of claim 1, wherein the vertical storage module further includes a storage shelf coupled to the upper shell to provide a storage surface, the storage shelf dividing the interior storage area into an upper storage area and a lower storage area.

8. The vehicle of claim 2, wherein the door is rotatably coupled to the shell via one or more hinges.

9. The vehicle of claim 8, wherein the vertical storage module further includes at least one gas strut coupled to the door.

10. A vehicle comprising:

a vehicle body including a truck bed at least partially defined by a floor, a forward wall, sidewalls, and a tailgate;

a pair of outboard support bars each coupled to and extending over one sidewall, wherein a vertical inner open area is defined between the support bar and the sidewall; and a vertical storage module disposed in the open inner area and including a shell defining an inner storage area, and a door rotatably coupled to the shell to selectively enclose the inner storage area, wherein each support bar includes a forward end and a rearward end, the rearward end coupled to the sidewall proximate the tailgate.

11. A vehicle comprising:

a vehicle body including a truck bed at least partially defined by a floor, a forward wall, sidewalls, and a tailgate;

a pair of outboard support bars each coupled to and extending over one sidewall, wherein a vertical inner open area is defined between the support bar and the sidewall; and a vertical storage module disposed in the open inner area and including a shell defining an inner storage area, and a door rotatably coupled to the shell to selectively enclose the inner storage area, wherein the inner open area defined between the support bar and the sidewall includes an outer profile shape, and wherein the vertical storage module includes an outer profile shape complimentary to the outer profile shape of the inner open area to give the vehicle the appearance of a wall.

12. The vehicle of claim 10, wherein the door comprises:

a door body;

an upper interior door rotatably coupled to the door body and movable between an open position giving access to an upper storage area of the inner storage area, and a closed position that encloses the upper storage area; and a lower interior door rotatably coupled to the door body and movable between an open position giving access to a lower storage area of the inner storage area, and a closed position that encloses the lower storage area.

13. The vehicle of claim 10, further comprising a stanchion coupled between the support bar forward end and the sidewall.

14. The vehicle of claim 13, wherein the stanchion is telescopic to move the support bar between a lowered position and a raised position.

15. The vehicle of claim 13, further comprising a grab handle coupled to the stanchion to assist a user.

16. The vehicle of claim 13, further comprising a crossrail coupled to the stanchion and extending across the truck bed.

17. The vehicle of claim 13, further comprising a crossrail removably coupled between the pair of support bars.

* * * * *